United States Patent
Youn et al.

(10) Patent No.: US 7,916,017 B2
(45) Date of Patent: Mar. 29, 2011

(54) OPERATING METHOD OF WIRELESS SENSOR NETWORKS CONSIDERING ENERGY EFFICIENCY

(75) Inventors: Hee Yong Youn, Gyeonggi-do (KR); Ki Young Jang, Gyeonggi-do (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 435 days.

(21) Appl. No.: 12/028,578

(22) Filed: Feb. 8, 2008

(65) Prior Publication Data
US 2008/0309480 A1 Dec. 18, 2008

(30) Foreign Application Priority Data
Jun. 13, 2007 (KR) .......... 10-2007-0057710

(51) Int. Cl.
*G08B 1/08* (2006.01)
(52) U.S. Cl. ......... 340/539.3; 340/539.1; 340/539.22; 340/539.26; 370/328; 370/338; 709/224
(58) Field of Classification Search ........... 340/539.3, 340/539.1, 539.22, 539.26; 370/310, 329, 370/328, 338; 709/224, 225
See application file for complete search history.

(56) References Cited

U.S. PATENT DOCUMENTS
7,505,874 B2 * 3/2009 Bley et al. ............ 702/188

FOREIGN PATENT DOCUMENTS
KR 10-2006-0055635 5/2006
* cited by examiner

*Primary Examiner* — Hung T. Nguyen
(74) *Attorney, Agent, or Firm* — Rabin & Berdo, P.C.

(57) ABSTRACT

Provided is a wireless sensor network operating method considering energy efficiency. The method for operating a wireless sensor network including clusters of sensor nodes includes: selecting a cluster head based on residual energy amounts of the sensor nodes by increasing a probability that a sensor node with a greater amount of residual energy than the others is selected as a cluster head; transmitting an advertisement message from the selected cluster head to the sensor nodes to form a cluster; and transmitting sensing data acquired in each sensor node to the cluster head. Accordingly, this method can extend lifespan of sensor nodes by not transmitting/receiving data on residual energy amounts and positions between sensor nodes, and increase the entire lifespan of a wireless sensor network by reducing a probability that a sensor node having a relatively small residual energy amount is selected as a cluster head consuming much energy.

11 Claims, 8 Drawing Sheets

OPERATING METHOD OF WIRELESS SENSOR NETWORKS CONSIDERING ENERGY EFFICIENCY

The present application claims priority under 35 U.S.C. 119 to Korean Patent Application No. 10-2007-0057710 (filed on Jun. 13, 2007), which is hereby incorporated by reference in its entirety.

TECHNICAL FIELD

Embodiments relates to a wireless sensor network operating method in consideration of energy efficiency and, more particularly, to a wireless sensor network operating method that can increase an overall lifespan of a wireless sensor network by reducing a probability that a sensor node with a relatively low residual energy amount than other sensor nodes is selected as a cluster head that consumes much energy to thereby improve energy efficiency.

BACKGROUND

Figure 1:
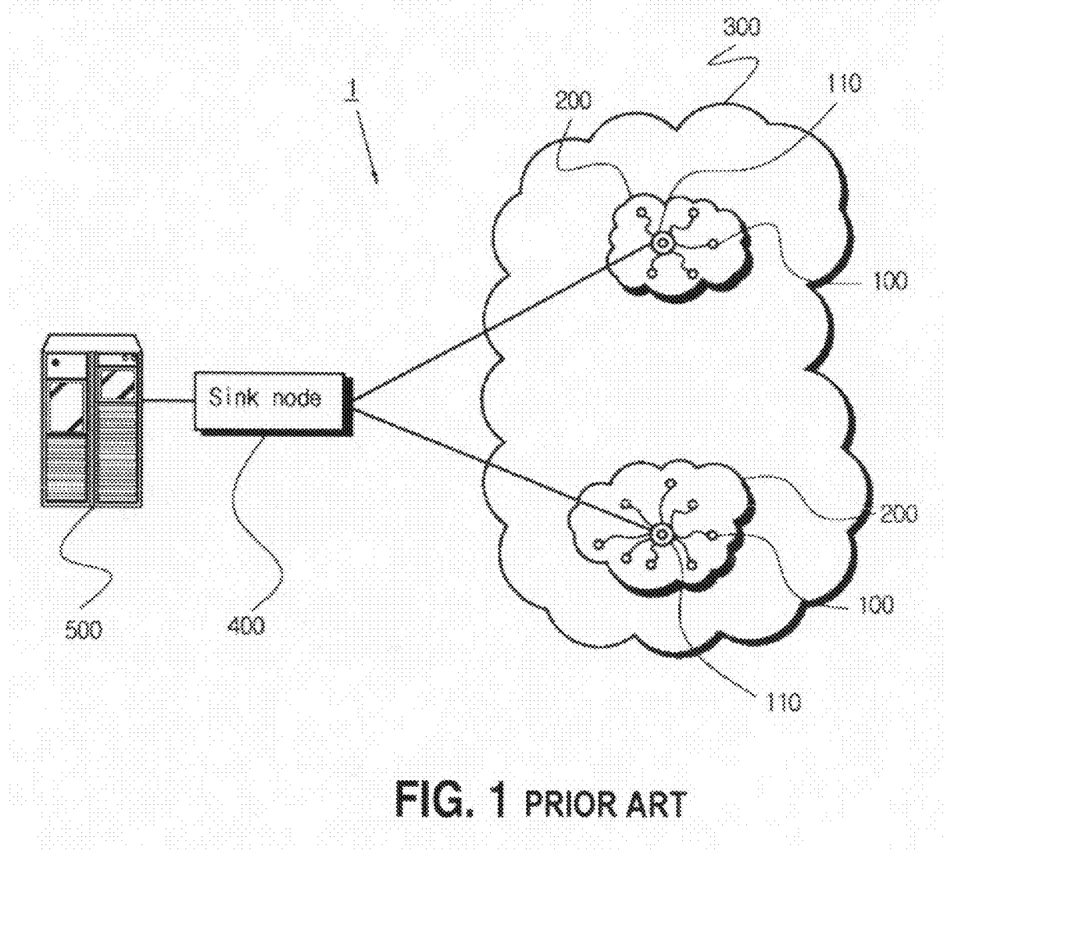
FIG. 1 illustrates a wireless sensor network.

Referring to FIG. 1, a wireless sensor network 1 is formed of a sensor field 300 where a plurality of sensor nodes 100 are disposed, and a sink node 400 connecting the sensor field 300 to a base station 500. The sensor nodes 100 of the sensor field 300 acquire sensing data, which are transmitted to the base station 500 through the sink node 400. The wireless sensor network 1 is used in diverse areas such as health monitoring, military networks, home networks, environmental observation, factory management, and anti-disaster management.

Each of the sensor nodes 100 has their own sensor node duration set up in consideration of a power source and lifespan (i.e., device duration) of respective devices constituting the sensor node. The sensor node duration will be referred to as 'energy,' hereinafter. The energy of each sensor node 100 is limited and it cannot be recharged.

Particularly, the energy of a sensor node 100 is rapidly drained when data are transmitted/received wirelessly in the wireless sensor network 1.

$$E_{Tx}(k,d) = (k \times E_{elec}) + (k \times \epsilon_{amp} \times d^2) \quad \text{Eq. 1}$$

where $E_{Tx}$ denotes the total amount of energy consumption during data transmission; k denotes the amount of data packets; d denotes wireless transmission/reception range; $\epsilon_{amp}$ denotes a constant of the amount of energy consumed during signal amplification in an amplifier; and $E_{elec}$ denotes a constant of the amount of energy consumed when data are converted into radio frequency (RF).

$$E_{Rx}(k,d) = k \times E_{elec} \quad \text{Eq. 2}$$

where $E_{Rx}$ denotes the total amount of energy consumption during data reception; k denotes the amount of data packets; and Eelec denotes a constant of the amount of energy consumed when data received in the form of RF are converted.

Figure 2:
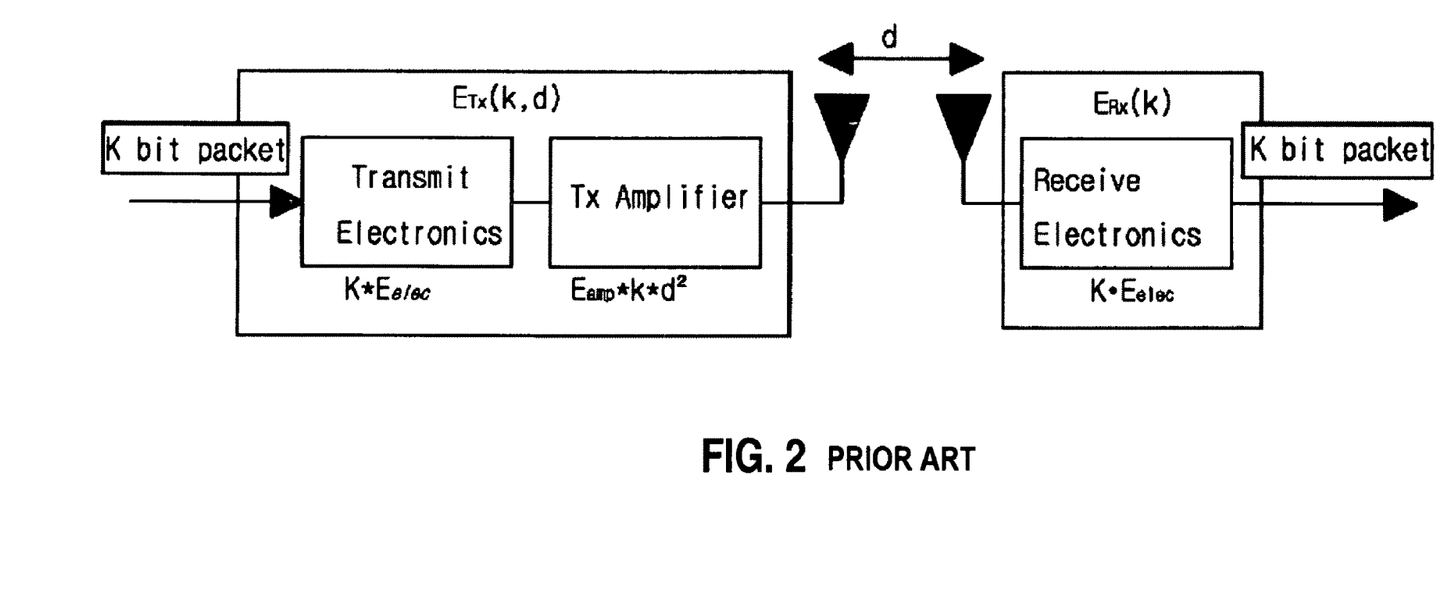
FIG. 2 illustrates the consumption amount of energy generated during transmission/reception of sensing results between nodes.

As shown in FIG. 2 and Equation 1, energy consumption increases in proportion to the amount (k) of packets and squared range during data transmission. During data reception, the energy consumption increases in proportion to the amount (k) of packets, as shown in FIG. 2 and Equation 2.

Therefore, it is desirable to reduce the number of times of performing wireless communication as much as possible in order to save energy of the sensor nodes 100.

Among methods for operating the wireless sensor network 1 is a Low Energy Adaptive Clustering Hierarchy (LEACH). LEACH is a method that sensor nodes 100 form a cluster 200 and a cluster head 110 randomly selected collects all informations in the cluster 200 and transmits them to the base station 500 through the sink node 400.

LEACH is executed through a selection stage, a cluster setup stage, a schedule generation stage, and a data transmission stage.

$$P(n) = \begin{cases} \dfrac{k}{1 - k \times \left(r \bmod \dfrac{1}{k}\right)} & \text{if } n \in C(n) \\ 0 & \text{otherwise} \end{cases} \quad \text{Eq. 3}$$

where P(n) denotes a threshold value; k denotes a constant indicating a composition ratio of a cluster head; r denotes a current round (i.e., operation time unit of LEACH); C(n) denotes a group of nodes which are not cluster heads for a past 1/k round.

In the cluster head selection stage, a threshold P(n) acquired from the Equation 3 is compared with a random number between 0 and 1 that is randomly selected. A sensor node 100 whose threshold P(n) is greater than the random number is selected as the cluster header 110. In a round, each sensor node 100 can be a cluster head 110 at a k probability. In the round, a sensor node 100 that becomes the cluster head 110 cannot be a cluster head 110 again for the next 1/k round. As rounds continue, an even smaller number of sensor nodes 100 are qualified to be selected as the cluster head 110, the probability of the remaining sensor nodes 100 to be selected as the cluster head 110 increases.

In the cluster setup stage, selected cluster heads 110 transmit an advertisement message to the sensor nodes 100. The sensor nodes 100 that have received the advertisement message from a plurality of cluster heads select a cluster head 110 to join based on received signal strength (RSS). A sensor node 100 transmits a join-request message (Join-REQ) to the cluster head 110 to join and set up a cluster 200.

In the scheduling setup stage, the cluster head 110 performs Time Division Multiple Access (TDMA) to allocate time to the sensor node 100 that has sent out the join-request message to itself. Accordingly, each sensor node 100 transmits a sensing result to the cluster head 110 at an allocated time.

In the data transmission stage, the sensing results transmitted from the sensor nodes 100 at the allocated time are collected, and data fusion is performed. The fused data are transmitted to the base station 500 through the sink node 400.

As described above, LEACH has an effect of extending the lifespan of the wireless sensor network 1 by randomly selecting cluster heads 110 in charge of transmitting data to the base station 500 and thereby distributing energy consumed for data transmission to all sensor nodes 100.

However, since LEACH randomly selects the cluster heads 110, even a sensor node 100 with a relatively smaller amount of residual energy than those of other sensor nodes 100 can be selected as a cluster head 110. Since the cluster head 110 should perform data fusion onto sensing results transmitted from sensor nodes 100 in a cluster 200 and deliver the fused data to the base station 500 through the sink node 400, it consumes more power than other sensor nodes 100.

Therefore, when a sensor node 100 with a relatively smaller amount of residual energy than those of other sensor nodes 100 is selected as a cluster head 110, it may consume all its energy for excessive data transmission and eventually complete its own lifespan. Consequently, there is a shortcoming in that when a sensor node 100 with a relatively smaller amount of residual energy than those of other sensor nodes 100 is selected as a cluster head 110, the lifespan of the wireless sensor network 1 is shortened.

To overcome this shortcoming, LEACH-C is developed. LEACH-C is a method of positioning the base station 500, the sink node 400, and the sensor nodes 100 and selecting cluster heads 110 in consideration of residual energy amount of each sensor node 100. In other words, since cluster heads 110 are selected in consideration of the entire residual energy amount of the wireless sensor network 1, there is no concern in the LEACH-C that a sensor node 100 with a small amount of residual energy might be selected as a cluster head 110.

Also, to figure out the positions and residual energy amounts of the base station 500, the sink node 400, and the sensor nodes 100 in LEACH-C, data on the positions and residual energy amounts should be transmitted/received among the sensor nodes 100. This also causes severe energy consumption during the data transmission/reception.

SUMMARY

Embodiments have been proposed in order to provide a wireless sensor network operating method that does not transmit/receive data on positions and residual energy amounts among sensor nodes to thereby extend lifespan of the sensor nodes, reduces a probability that a sensor node with a relatively smaller amount of residual energy than those of the other sensor nodes is selected as a cluster head 110 to thereby increase the entire lifespan of a wireless sensor network.

In embodiments, a method for operating a wireless sensor network including clusters each formed of a plurality of sensor nodes, includes the steps of: a) selecting a cluster head based on residual energy amounts of the sensor nodes by increasing a probability that a sensor node with a greater amount of residual energy than the others is selected as a cluster head; b) transmitting an advertisement message from the selected cluster head to the sensor nodes to thereby form a cluster; and c) transmitting sensing data acquired in each sensor node to the cluster head.

Herein, the cluster head selection step a) may include the steps of: a-1) calculating an energy value of each sensor node based on the residual energy amount of the sensor node in comparison with an initial energy amount of the sensor node; and a-2) comparing the energy value with a random number between 0 and 1 and selecting a sensor node having an energy value greater than a random number as a cluster head.

The energy value comparison step a-2) may include the steps of: a-2-1) when there is at least one sensor node whose residual energy amount is less than 50% of the initial energy amount of the sensor node, comparing the energy value of the sensor node with the random number between 0 and 1 and selecting the sensor node whose energy value is greater than the random number as the cluster head; and a-2-2) when the residual energy amount of the sensor node is equal to or more than 50% of the initial energy amount of the sensor node, selecting the cluster head through Low Energy Adaptive Clustering Hierarchy (LEACH).

The energy value may be calculated based on an equation expressed as:

$$Pi(n) = 2 \times k \times \left(\frac{Er}{Ei}\right).$$

Herein, Pi(n) denotes an energy value; k denotes a constant indicating a probability to be a cluster head (which is a composition ratio of a cluster head); Er denotes a residual energy amount of a sensor node; and Ei denotes an initial energy amount of a sensor node.

The step b) may include the steps of: b-1) transmitting the advertisement message including information on residual energy of the cluster head from the selected cluster head to the sensor nodes; b-2) calculating a cost value in the sensor nodes based on a signal strength of the advertisement message and the residual energy of the cluster head; and b-3) transmitting a joint-request message from the sensor nodes to the cluster head having a cost value greatest among calculated cost values to thereby form a cluster.

A reference condition may be set up in the sensor nodes, and when the sensing data acquired in the sensor nodes satisfy the reference condition, the step c) includes a step of transmitting the sensing data to the cluster head.

In another embodiment, a method for operating a wireless sensor network by selecting a cluster head among a plurality of sensor nodes and transmitting an advertisement message from the selected cluster head to the sensor nodes to form a cluster, includes the steps of: transmitting an advertisement message including information on residual energy of the cluster head from the selected cluster head to the sensor nodes; calculating a cost value in the sensor nodes based on a signal strength of the advertisement message and the residual energy of the cluster head; and transmitting a joint-request message from the sensor nodes to the cluster head having a cost value greatest among calculated cost values to thereby form a cluster.

In another embodiment, a method for operating a wireless sensor network by selecting a cluster head among a plurality of sensor nodes includes transmitting an advertisement message from the selected cluster head to the sensor nodes to form a cluster, and transmitting sensing data acquired in the sensor nodes to the cluster head, the method which includes the steps of: setting up a reference condition in the sensor nodes, and when the sensing data satisfy the reference condition, transmitting the sensing data to the cluster head.

DESCRIPTION

Hereinafter, embodiments will be described in detail with reference to the accompanying drawings.

Figure 3:
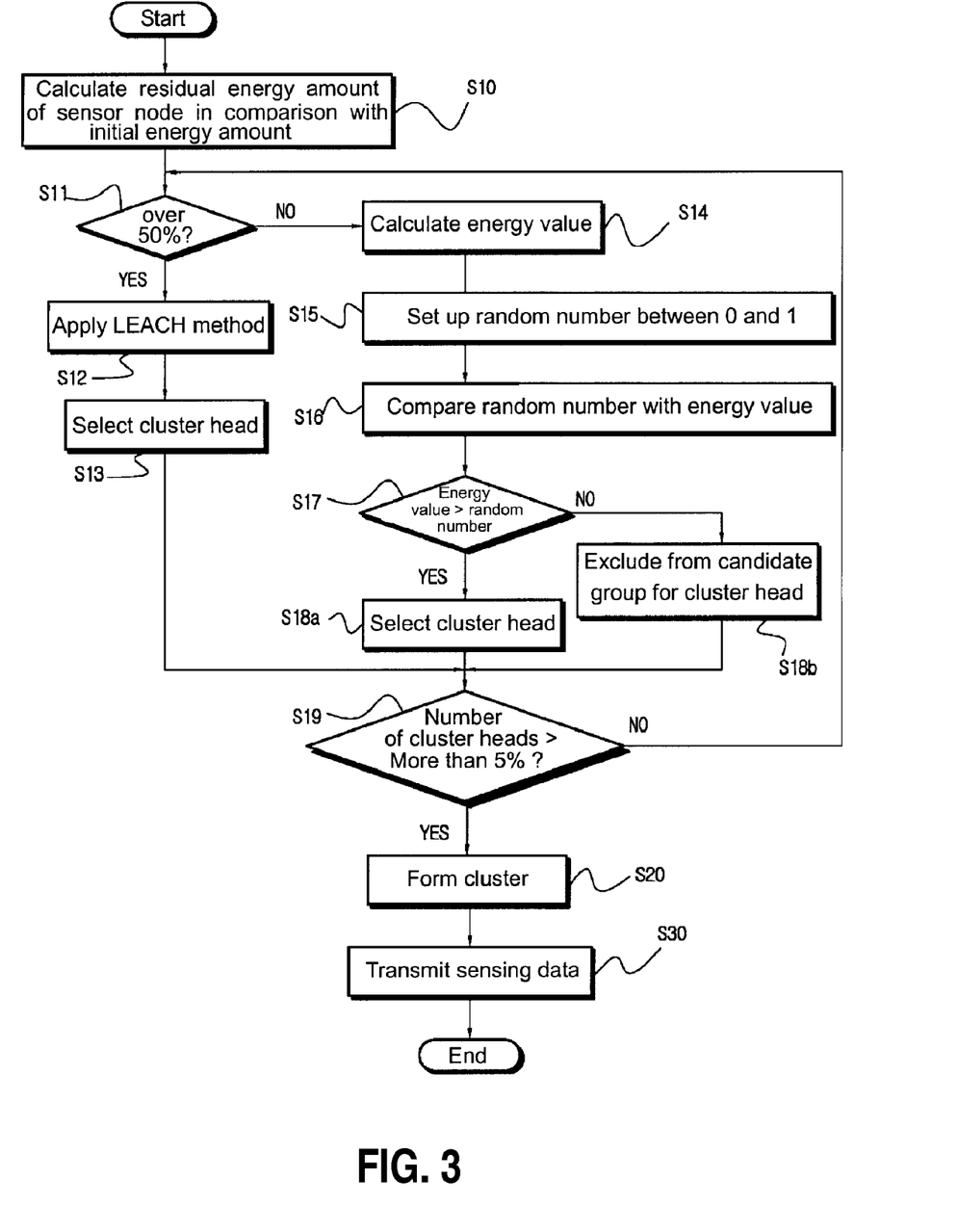
FIG. 3 is a flowchart describing a wireless sensor network operating method in consideration of energy efficiency in accordance with an embodiment.

Referring to FIG. 3, a wireless sensor network operating method considering energy efficiency, which is suggested in the present invention, includes a cluster head selection stage S10 to S19, a cluster forming stage (S20), and a transmission stage (S30).

In the cluster head selection stage (steps S10 to S19), a cluster head 110 is selected based on the residual energy amount of sensor nodes 100. That is, the more residual energy a sensor node 100 has, the more highly likely the sensor node 100 is to be selected as the cluster head 110.

Hereinafter, the cluster head selection stage (steps S10 to S19) will be described with reference to FIG. 3.

Referring to FIG. 3, sensor nodes 100 calculate their residual energy amount compared to their initial energy amount at step S10. At step S14, each sensor node 100 calculates an energy value based on the current residual energy amount with respect to its initial energy amount.

$$Pi(n) = 2 \times k \times \left(\frac{Er}{Ei}\right) \qquad \text{Eq. 4}$$

where Pi(n) denotes an energy value; k denotes a constant indicating a probability to be a cluster head (which is a composition ratio of a cluster head); Er denotes a residual energy amount of a sensor node; and Ei denotes an initial energy amount of a sensor node.

The Equation 4 calculates an energy value in each sensor node 100. As shown in Equation 4, the energy value of the sensor node 100 is decided based on the residual energy amount (Er) of the sensor node in the present embodiment, which is different from a threshold value (see Equation 3) used to select the cluster head 110 in the conventional LEACH technology.

At step S15, a random number between 0 to 1 is extracted. At step S16, the calculated energy value is compared with the random number between 0 to 1. When the energy value of the sensor node 100 is greater than the random number at step S17, the sensor node 100 is selected as the cluster head 110 at step S18a.

When the energy value of the sensor node 100 is smaller than the random number at the step S17, the sensor node 100 is excluded from a candidate group for the cluster head 110 at step S18b.

Meanwhile, each sensor node 100 analyzes its current residual energy amount in comparison with its initial energy amount and see if the current residual energy amount exceeds 50% of the initial energy amount at step S11. When the current residual energy amount is less than 50% of the initial energy amount at step S11, the sensor node 100 calculates it energy value based on the Equation 4, and it may be selected as the cluster head 110 through the process of the steps S15 to S17.

Also, when the current residual energy amount is more than 50% of the initial energy amount at the step S11, the sensor node 100 may be selected as the cluster head 110 through a typical LEACH method at steps S12 and S13.

Also, a cluster 200 is formed at step S20 only when the number of cluster heads 110 selected through the steps S10 to S18 is equal to or more than 5% of the total number of sensor nodes 100. When the number of cluster heads 110 selected through the steps S10 to S18 is less than 5% of the total number of sensor nodes 100, the steps S11 to S18 are repeated. This is because when the number of the cluster heads 110 is less than 5% of the total number of sensor nodes 100, the energy efficiency of the wireless sensor network 1 is low.

Thus, in the cluster head selection stage (steps S10 to S19) of the present embodiment, when the residual energy amount of each sensor node 100 is as low as less than 50%, the lifespan of the wireless sensor network 1 can be extended by decreasing a probability that a sensor node 100 with a low residual energy amount is selected as a cluster head 110 based on a cluster head selection equation of the present embodiment, which is the Equation 4.

Also, although the present embodiment is described by taking an example where either the cluster head selection equation of the present embodiment (which is Equation 4) or a conventional LEACH is used according to the residual energy amount of each sensor node 100, it is possible to select a cluster head 110 only by using the cluster head selection equation of the present embodiment (which is Equation 4).

When the cluster heads 110 are selected, a cluster 200 is formed in the cluster formation stage (step S20).

In the cluster formation stage (step S20), the cluster heads 110 selected through the cluster head selection stage (S10 to S19) transmit advertisement messages to the sensor nodes 100 to thereby form a cluster 200.

Figure 4:
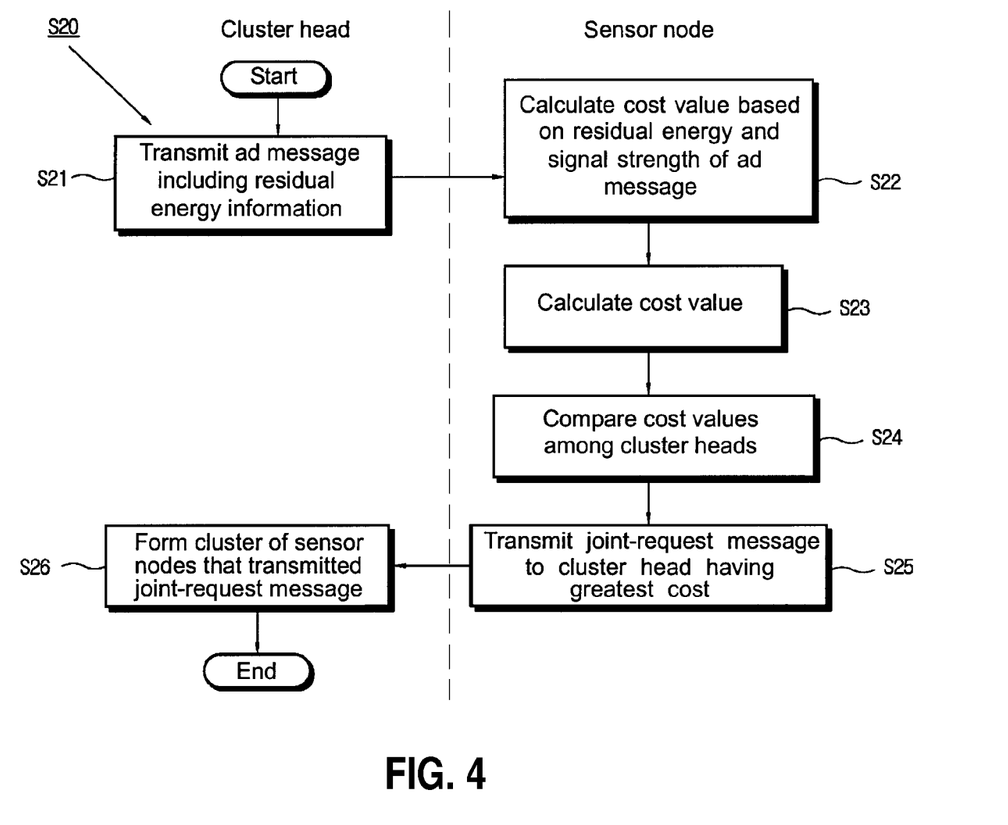
FIG. 4 is a flowchart describing a step of forming a cluster in the wireless sensor network operating method considering energy efficiency in accordance with the embodiment.

The cluster formation stage is described in detail in FIG. 4 more specifically than in FIG. 3.

Referring to FIG. 4, when cluster heads 110 are selected, they transmit advertisement messages to the sensor nodes 100 at step S21. The advertisement messages transmitted from the cluster heads 110 include information on residual energy amount of the cluster heads 110.

$$\text{Cost}(i) = CH(i)\text{remainenergy} + CH(i)\text{signal energy} \qquad \text{Eq. 5}$$

where Cost(i) denotes a cost value; CH(i) denotes the residual energy amount of a cluster head; and CH(i) signal energy denotes a signal strength of an advertisement message of a cluster head measured in a sensor node.

As shown in the Equation 5, each sensor node 100 that has received an advertisement message calculates a cost value at step S23 by summing the residual energy amount of a cluster head 110 with the signal strength of the advertisement message.

Herein, the sensor node 100 can estimate the strength of signals transmitted/received between cluster heads 110 based on the signal strength of the advertisement message transmitted from the cluster head 110. This signifies that as the range is short, the signal strength increases. As the signal strength of a selected cluster head 110 is higher, the energy loss amount is reduced when signals are transmitted/received between the sensor node 100 and the cluster heads 110.

Also, the residual energy amount may differ among cluster heads 110. As described above, when the cluster head 110 is selected and sensing data are transmitted/received between the sensor node 100 and the sink node 400, the amount of energy consumed in the transmission of the sensing data is affected by the amount of the sensing data, that is, the amount of data packets. In short, the smaller the number of the sensor nodes 100 is in a cluster 200, the smaller the amount of data packets becomes. Thus, a small number of the sensor nodes 100 in the cluster 200 signifies a reduced amount of energy consumed in the cluster head 110.

Therefore, when a cluster head 110 having much residual energy amount than the other cluster heads 110 has more sensor nodes 100 in its cluster 200 than the other cluster heads 110, it is possible to reduce a difference between residual energy amounts of the cluster heads 110. This brings about an increased lifespan of the wireless sensor network.

Therefore, the sensor nodes 100 calculate the residual energy amounts of the respective cluster heads 110 and signal strengths of the advertisement messages of the cluster heads 110 that are measured in the sensor nodes 100 at step S22, and calculate cost values at step S23. At step S24, the acquired cost values are compared with each other, and the sensor nodes 100 transmits join-request messages to a cluster head 110 having a greatest cost value at step S25.

In response, the cluster head 110 collects the sensor nodes 100 that have transmitted the join-request messages to thereby form a cluster 200.

Herein, the formation of the cluster 200 according to the present embodiment can reduce the total amount of energy consumed in the wireless sensor network 1 by decreasing the amount of energy consumed according to the range between the sensor nodes 100 and the cluster head 110.

Also, the formation of the cluster 200 according to the present embodiment can reduce the total amount of energy consumed in the wireless sensor network 1 by allocating more sensor nodes 100 to a cluster head 110 having a greater residual energy amount than to the other cluster heads 110 having a smaller residual energy amount in their cluster 200.

Herein, it is apparent to those skilled in the art to which the present embodiment pertains that the total amount of energy consumed in the wireless sensor network 1 can be reduced only by executing the cluster formation stage (steps S21 to S26) without the above-described cluster head selection stage (S10 to S19) and thereby the energy efficiency of the wireless sensor network 1 can be improved.

When the cluster 200 is formed through the cluster formation step S20, the sensor nodes 100 enters a transmission stage, which is a step S30) to transmit the sensing data to the cluster head 110.

Figure 5:
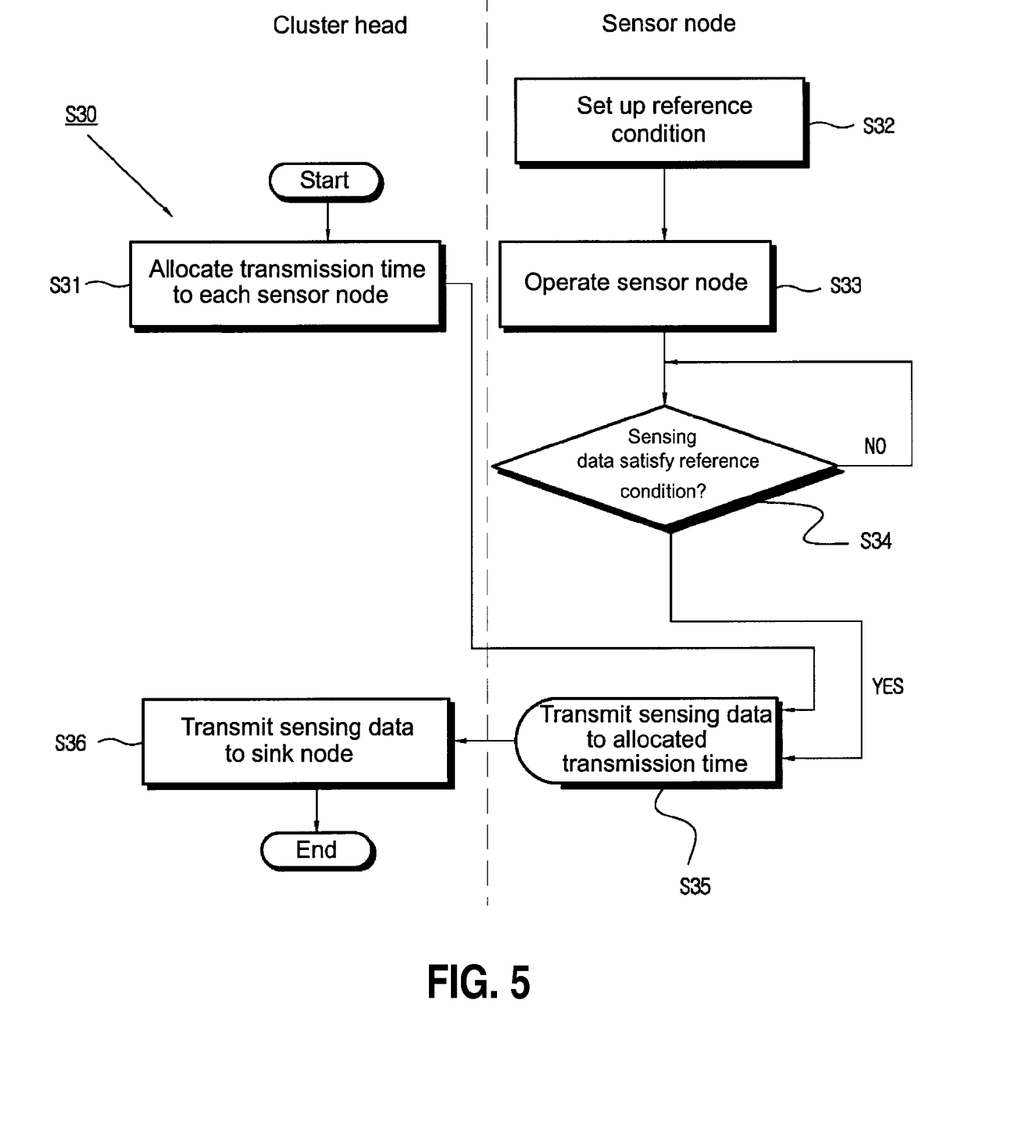
FIG. 5 is a flowchart describing a step of transmitting a sensing result from a sensor node to a cluster head in the wireless sensor network operating method considering energy efficiency in accordance with the embodiment.
Figure 6:
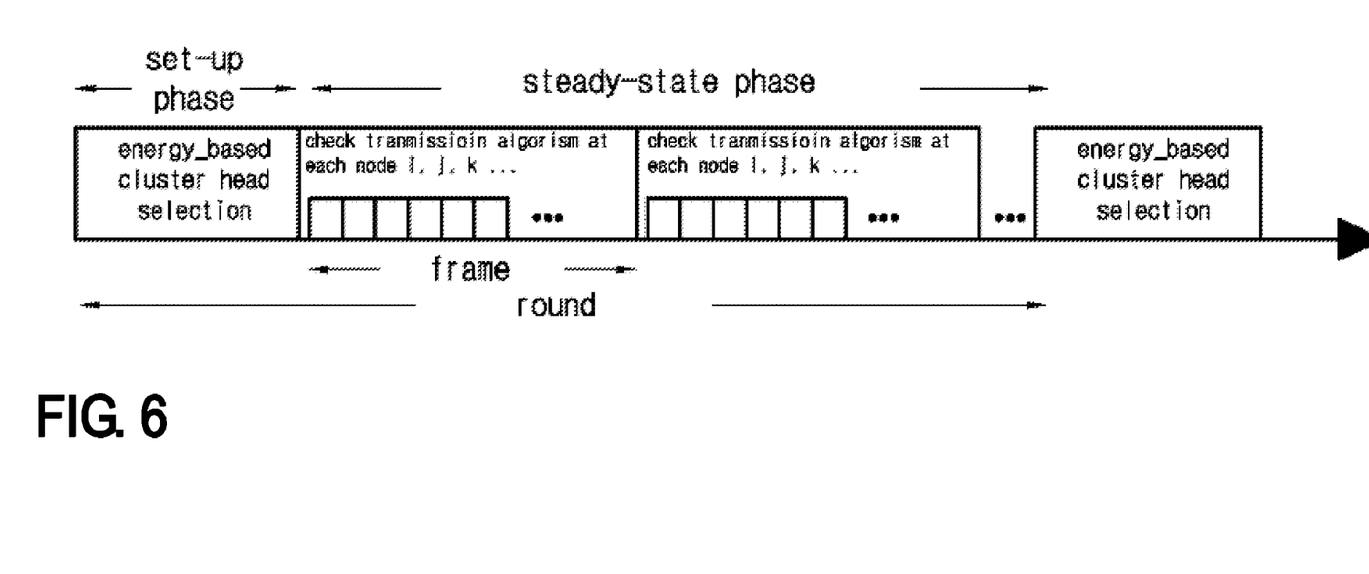
FIG. 6 illustrates an operation process of FIG. 5.

FIG. 5 illustrates the transmission stage (S30) of FIG. 3 in detail. Referring to FIG. 50, when a cluster 200 is formed, the cluster head 110 allocates an available transmission time to each sensor node 100 in the cluster 200 at step S31. As shown in FIG. 6, transmission of the sensing data from the sensor nodes 100 to the cluster head 110 is carried out through Time Division Multiple Access (TDMA). This is to reduce the energy consumption amount of each sensor node 100 by turning it in an active mode at the possible transmission time allocated to each sensor node 100 and having it transmit the sensing data to the cluster head 110 only at the allocated transmission time.

Therefore, as illustrated in FIG. 6, a steady-state phase where the sensing data are divided into a plurality of frames and transmitted from each sensor node 100 to the cluster head 110 comes in after a set-up phase where the cluster head 110 and the cluster 200 are set up in one round. Herein, each sensor node 100 of one frame can transmit the sensing data to the cluster head 110 only at the allocated transmission time.

The transmission stage (S30) of the present embodiment includes a reference condition setup step S32 where reference conditions are set up to decide whether to transmit sensing data of the sensor node 100. When the reference conditions are set up at the reference condition setup step S32, the sensor node 100 operates to output the sensing data at step S33. At step S34, the sensor node 100 decides whether the sending data satisfy the reference conditions.

The reference conditions may be changed according to a field where the wireless sensor network 1 is used. For example, when it is assumed that sensor nodes 100 are disposed in rooms to measure the temperature of each room and the reference conditions are set up to "transmit sensing data only when the room temperature is higher than 30☐," the sensor nodes 100 transmit sensing data to the cluster head 110 only when the sensing data are equal to or higher than 30☐.

Therefore, the sensor nodes 100 with reference conditions set up therein do not transmit sensing data to the cluster head 110 if the reference data are not fulfilled, although the allocated transmission time comes. Accordingly, the amount of energy consumption of each sensor node 100 can be reduced by decreasing the frequency of transmitting the sensing data to the cluster head 110.

Therefore, at step S35, the sensor node 100 transmits the sensing data to the cluster head 110 only when the sensing data satisfy the reference condition and the allocated transmission time comes. At step S36, the cluster head 110 receives the sensing data from the sensor node 100 and transmits them to the sink node 400.

Herein, it is apparent to those skilled in the art to which the present embodiment pertains that the total amount of energy consumed in the wireless sensor network 1 can be reduced only by executing the transmission stage (steps S31 to S36) without the cluster head selection stage (S10 to S19) and the cluster formation stage (steps S21 to S26) which are described above and thereby the energy efficiency of the wireless sensor network 1 can be improved.

Hereinafter, simulation results of the wireless sensor network operating method proposed in the present embodiment will be compared with the typical LEACH and LEACH-C by referring to FIGS. 7 and 8, hereinafter.

TABLE 1

| | |
|---|---|
| Size of Network | 100 m × 100 m |
| Size of Data Packets | 500 bytes |
| $E_{elec}$ (Radio electronic energy) | 50 nJ/bit |
| $E_{amp}$ (Radio amplification energy) | 100 pJ/bit/m² |
| $E_{init}$ (Initial energy of each node) | 2 J |
| Number of Nodes | 100 |

The above Table 1 describes an environment for simulating the wireless sensor network operating method according to an embodiment. The size of the network for simulating the wireless sensor network operating method of the present embodiment is a square of 100 m×100 m and the size of data packets is 500 bytes. Also, the initial energy of each sensor node 100 is 2 J, and the amplification energy during data transmission is 100 pJ/bit/m². The energy basically used for data transmission/reception is 50 nJ/bit.

The lifespan of a wireless network was measured in the simulation to assess the wireless sensor network operating method of the present embodiment, and the result was compared with results obtained through the typical LEACH and LEACH-C.

Figure 7:
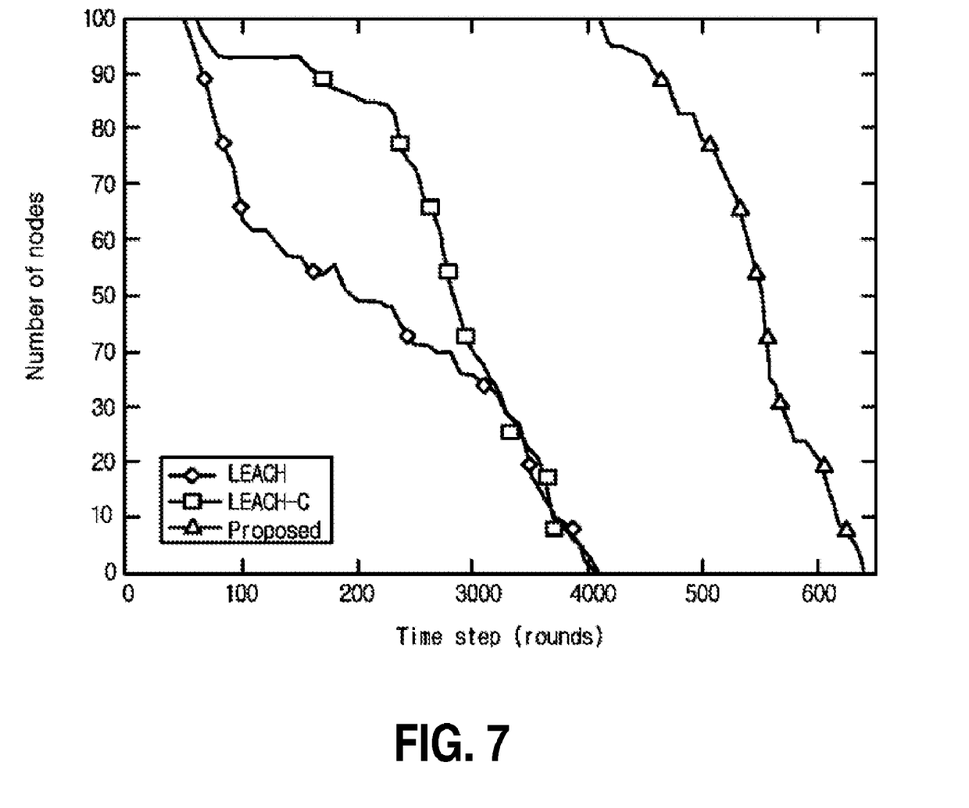
FIGS. 7 and 8 are graphs showing simulation results of performing typical LEACH, typical LEACH-C, and a wireless sensor network operating method.

FIG. 7 are graphs showing simulation results of performing the wireless sensor network operating method of the present embodiment, typical LEACH, and typical LEACH-C. It presents graphs showing the lifespan of 100 sensor nodes 100 after performing the simulation.

Herein, X axis denotes time marked as rounds, whereas Y axis denotes the number of surviving sensor nodes 100 among the 100 sensor nodes 100.

The result showed that the lifespan of the sensor nodes 100 operated according to the wireless sensor network operating method (see a graph indicated as ◇) of the present embodiment was longer than the lifespan of the sensor nodes 100 operated according to the LEACH (see a graph indicated as ☐) and the LEACH-C (see a graph indicated as ☐).

It took a time of about 800 seconds in the network of LEACH until the sensor nodes 100 of 10 J die, and it took a time of 70 rounds in the network of LEACH-C until the first sensor node 100 dies. On the other hand, it took a time of 420 rounds in the network operated in the wireless sensor network operating method of the present embodiment until the first sensor node 100 dies.

Also, it took a time of 420 rounds in the network of LEACH until all the sensor nodes 100 die, and it took a time of 430 rounds in the network of LEACH-C until all the sensor nodes 100 die. On the other hand, it took a time of 640 rounds in the network operated in the wireless sensor network operating method of the present embodiment until all the sensor nodes 100 die.

Figure 8:
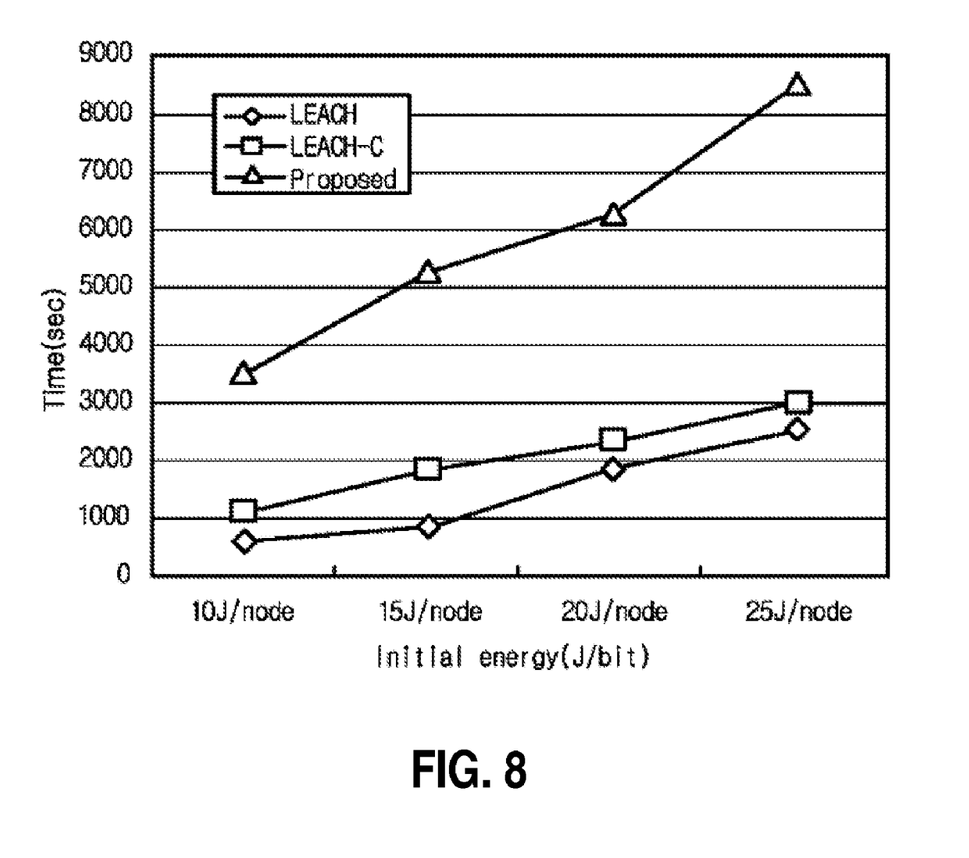

FIG. 8 are graphs showing simulation results of a wireless sensor network operating method of the present embodiment, typical LEACH and typical LEACH-C while varying the initial energy amount of the sensor nodes 100.

Herein, X axis denotes variation of initial energy amount of the sensor nodes 100, whereas Y axis denotes time (sec) until the sensor nodes 100 die.

The result showed that the lifespan of a wireless sensor network operated according to the wireless sensor network operating method (see a graph indicated as ◇) of the present embodiment was longer than the lifespan of networks operated according to the LEACH (see a graph indicated as □) and the LEACH-C (see a graph indicated as □).

It took about 800 seconds in the network of LEACH until 10 J sensor nodes 100 die, and it took about 1200 seconds in the network of LEACH-C until 10 J sensor nodes 100 die. On the other hand, it took about 3500 seconds in the network operated in the wireless sensor network operating method of the present embodiment until 10 J sensor nodes 100 die.

Also, it took about 2500 seconds in the network of LEACH until 25 J sensor nodes 100 die, and it took about 3000 seconds in the network of LEACH-C until 25 J sensor nodes 100 die. On the other hand, it took about 8500 seconds in the network operated in the wireless sensor network operating method of the present embodiment until 25 J sensor nodes 100 die.

As shown in the simulation results, the wireless sensor network operating method of the present embodiment can reduce the amount of energy consumed in each sensor node 100 more than the conventional LEACH and LEACH-C technologies.

In consequences, the wireless sensor network operating method of the present embodiment can increase the lifespan of a wireless sensor network by more than 37%, compared to the conventional LEACH technology, and increase the lifespan of a wireless sensor network by more than 30%, compared to the conventional LEACH-C technology. Therefore, the wireless sensor network operating method of the present embodiment is excellent in the respect of energy efficiency.

The wireless sensor network operating method considering energy efficiency, which is proposed in the present embodiment, reduces a probability that a sensor node 100 having a relatively small amount of residual energy than the other sensor nodes 100 to thereby increase the entire lifespan of a wireless sensor network.

Also, the wireless sensor network operating method of the present embodiment can reduce difference in energy amounts among cluster heads by increasing the number of sensor nodes in a cluster of a cluster head having much residual energy to thereby increase the entire lifespan of a wireless sensor network.

In addition, the wireless sensor network operating method of the present embodiment can reduce the amount of energy consumed for wireless data transmission/reception by transmitting sensing data appropriate for a reference condition to a cluster head to thereby increase the entire lifespan of a wireless sensor network.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

What is claimed is:

1. A method for operating a wireless sensor network using a micro-controller including clusters each formed of a plurality of sensor nodes, the method comprising the steps of:
   a) selecting a cluster head based on residual energy amounts of the sensor nodes by increasing a probability that a sensor node with a greater amount of residual energy than the others is selected as a cluster head;
   b) transmitting an advertisement message from the selected cluster head to the sensor nodes to thereby form a cluster; and
   c) transmitting sensing data acquired in each sensor node to the cluster head,
   wherein the step a) includes the steps of:
   a-1) calculating an energy value of each sensor node based on the residual energy amount of the sensor node in comparison with an initial energy amount of the sensor node; and
   a-2) comparing the energy value with a random number between 0 and 1 and selecting a sensor node having an energy value greater than a random number as a cluster head.

2. The method of claim 1, wherein the step a-2) includes the steps of:
   a-2-1) when there is at least one sensor node whose residual energy amount is less than 50% of the initial energy amount of the sensor node, comparing the energy value of the sensor node with the random number between 0 and 1 and selecting the sensor node whose energy value is greater than the random number as the cluster head; and
   a-2-2) when the residual energy amount of the sensor node is equal to or more than 50% of the initial energy amount of the sensor node, selecting the cluster head through Low Energy Adaptive Clustering Hierarchy (LEACH).

3. The method of claim 2, wherein the energy value is calculated based on an equation expressed as:

$$Pi(n) = 2 \times k \times \left(\frac{Er}{Ei}\right)$$

where Pi(n) denotes an energy value; k denotes a constant indicating a probability to be a cluster head (which is a composition ratio of a cluster head); Er denotes a residual energy amount of a sensor node; and Ei denotes an initial energy amount of a sensor node.

4. The method of claim 3, wherein the step b) includes the steps of:
   b-1) transmitting the advertisement message including information on residual energy of the cluster head from the selected cluster head to the sensor nodes;
   b-2) calculating a cost value in the sensor nodes based on a signal strength of the advertisement message and the residual energy of the cluster head; and
   b-3) transmitting a joint-request message from the sensor nodes to the cluster head having a cost value greatest among calculated cost values to thereby form a cluster.

5. The method of claim 4, wherein a reference condition is set up in the sensor nodes, and when the sensing data acquired in the sensor nodes satisfy the reference condition, the step c) includes a step of transmitting the sensing data to the cluster head.

6. The method of claim 2, wherein the step b) includes the steps of:
   b-1) transmitting the advertisement message including information on residual energy of the cluster head from the selected cluster head to the sensor nodes;
   b-2) calculating a cost value in the sensor nodes based on a signal strength of the advertisement message and the residual energy of the cluster head; and
   b-3) transmitting a joint-request message from the sensor nodes to the cluster head having a cost value greatest among calculated cost values to thereby form a cluster.

7. The method of claim 6, wherein a reference condition is set up in the sensor nodes, and
   when the sensing data acquired in the sensor nodes satisfy the reference condition, the step c) includes a step of transmitting the sensing data to the cluster head.

8. The method of claim 1, wherein the step b) includes the steps of:
   b-1) transmitting the advertisement message including information on residual energy of the cluster head from the selected cluster head to the sensor nodes;
   b-2) calculating a cost value in the sensor nodes based on a signal strength of the advertisement message and the residual energy of the cluster head; and
   b-3) transmitting a joint-request message from the sensor nodes to the cluster head having a cost value greatest among calculated cost values to thereby form a cluster.

9. The method of claim 8, wherein a reference condition is set up in the sensor nodes, and
   when the sensing data acquired in the sensor nodes satisfy the reference condition, the step c) includes a step of transmitting the sensing data to the cluster head.

10. A method for operating a wireless sensor network using a micro-controller including clusters each formed of a plurality of sensor nodes, the method comprising the steps of:
    a) selecting a cluster head based on residual energy amounts of the sensor nodes by increasing a probability that a sensor node with a greater amount of residual energy than the others is selected as a cluster head;
    b) transmitting an advertisement message from the selected cluster head to the sensor nodes to thereby form a cluster; and
    c) transmitting sensing data acquired in each sensor node to the cluster head,
    wherein the step b) includes the steps of:
    b-1) transmitting the advertisement message including information on residual energy of the cluster head from the selected cluster head to the sensor nodes;
    b-2) calculating a cost value in the sensor nodes based on a signal strength of the advertisement message and the residual energy of the cluster head; and
    b-3) transmitting a joint-request message from the sensor nodes to the cluster head having a cost value greatest among calculated cost values to thereby form a cluster.

11. The method of claim 10, wherein a reference condition is set up in the sensor nodes, and
    when the sensing data acquired in the sensor nodes satisfy the reference condition, the step c) includes a step of transmitting the sensing data to the cluster head.

* * * * *